United States Patent
Nakayama

(10) Patent No.: US 8,276,169 B2
(45) Date of Patent: Sep. 25, 2012

(54) MEDIUM PROCESSING DEVICE

(75) Inventor: Hiroyuki Nakayama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 12/362,613

(22) Filed: Jan. 30, 2009

(65) Prior Publication Data

US 2009/0193448 A1    Jul. 30, 2009

(30) Foreign Application Priority Data

Jan. 30, 2008 (JP) ................................. 2008-019789

(51) Int. Cl.
*G11B 17/03* (2006.01)
(52) U.S. Cl. .................... 720/606; 720/601; 720/604
(58) Field of Classification Search ............... 720/606, 720/601, 604; 369/30.34, 30.57
See application file for complete search history.

(56) References Cited

U.S. PATENT DOCUMENTS

| | | | |
|---|---|---|---|
| 5,668,790 A | | 9/1997 | Koizumi et al. |
| 5,734,629 A | * | 3/1998 | Lee et al. .................... 369/30.34 |
| 5,742,571 A | | 4/1998 | Hoshino et al. |
| 6,409,232 B1 | * | 6/2002 | Nigro et al. ....................... 292/92 |
| 7,349,294 B2 | * | 3/2008 | Lilland et al. .............. 369/30.57 |
| 7,885,148 B2 | * | 2/2011 | Ikeda .......................... 369/30.34 |

FOREIGN PATENT DOCUMENTS

| | | |
|---|---|---|
| JP | 6-314459 | 11/1994 |
| JP | 8-335385 | 12/1996 |
| JP | 2000-222809 | 8/2000 |
| JP | 2002237123 A | 8/2002 |

OTHER PUBLICATIONS

European Search Report, EP Applicaiton No. 09001289, Mailed Sep. 9, 2009.

* cited by examiner

*Primary Examiner* — Gene Auduong
(74) *Attorney, Agent, or Firm* — Nutter McClennen & Fish LLP; John J. Penny, V

(57) ABSTRACT

A medium processing device is provided. A processor processes a plate-shaped medium. A tray has a storage for storing the medium and is movable between a first position where the medium is processed by the processor and a second position where the medium is mounted and removed from the storage. A moving mechanism moves the tray between the first position and the second position. A transporting mechanism mounts the medium in the storage and removing the medium from the storage. A restraining member restrains an upward movement of a front end of the tray that is moved to the second position by the moving mechanism.

3 Claims, 9 Drawing Sheets

MEDIUM PROCESSING DEVICE

Priority is claimed to Japanese Patent Application No. 2008-019789 filed Jan. 30, 2008, the disclosure of which, including the specification, drawings and claims, is incorporated herein by reference in its entirety.

BACKGROUND

The present invention relates to a medium processing device that includes a medium transporting mechanism for transporting disc-shaped medium such as CDs or DVDs to a tray, and a tray moving mechanism for moving the tray between a first position and a second position.

In recent years, a medium processing device such as a disc duplication device has been used for writing data on recordable media (information recording media) such as plural sheets of blank CDs (Compact Discs) or blank DVDs (Digital Versatile Discs), and a CD/DVD publisher capable of writing data and performing label printing has been used to prepare and issue a medium. This kind of medium processing device includes a medium transporting mechanism that has a transporting arm for holding and transporting a medium to a processing unit for writing data and performing printing on the medium and a tray moving mechanism (for example, see Patent Document 1).

Patent Document 1: U.S. Pat. No. 5,734,629

The medium processing device includes a drive for writing data on a medium and/or reading data from a medium. The drive includes a medium tray capable of being projected from and retracted into a drive main body by a rack and a pinion, for example. The medium processing device also includes a transporting arm that has a holding unit for holding the medium and is capable of moving up and down and rotating to transport the medium. When the medium tray is projected from the drive main body, the transporting arm moves up and down so as to mount the medium on the medium tray or remove the medium from a concave reception portion of the medium tray.

In this case, the medium tray moved by the rack and the pinion has a structure in which the medium tray is moved until a rear-side portion of the medium tray comes in contact with a movement stopping portion provided within the drive and the projected medium tray is stopped at a predetermined position. With this structure, the medium tray can be stopped at a constant stop position.

However, when the medium tray comes in contact with the movement stopping portion, the front end of the medium tray is pivoted upwardly due to a collision between the medium tray and the movement stopping portion. Consequently, the medium stored in the concave reception portion of the medium tray may fall out of the concave reception portion. In this case, the holding unit of the medium transporting mechanism cannot hold the medium and thus interferes with the reception of the medium. As a result, the medium processing cannot be smoothly carried out.

SUMMARY

It is therefore an object of at least one embodiment of the invention to provide a medium processing device capable of smoothly performing various medium processing by restraining a front end of a moved medium tray from pivoting upwardly and keeping a medium in a state where the medium is reliably mounted on the reception portion of the medium tray to improve reliability for mounting the medium.

According to an aspect of at least one embodiment of the invention, there is provided a medium processing device comprising: a processor that processes a disc-shaped medium; a tray having a storage that stores the medium, and being movable between a first position where the medium is processed by the processor and a second position where the medium is mounted on and removed from the storage; a moving mechanism that moves the tray between the first position and the second position; a transporting mechanism that mounts the medium on the storage and removes the medium from the storage; and a restraining member that restrains upward movement of a front end of the tray that is moved to the second position by the moving mechanism.

With this configuration, when the tray is moved to the second position where the medium is mounted on and is removed from the storage by the tray moving mechanism, the restraining member restrains the front end of the tray from moving upwardly. Therefore, the upward movement of the tray caused by the collision between the tray and the movement stopping portion is restrained by the restraining member, even when the moved tray comes in contact with the movement stopping portion for restraining movement of the tray. Accordingly, since the medium mounted on the storage of the tray and is restrained from moving out of the storage, it is possible to prevent the medium from falling out of the storage.

Accordingly, since reliability for mounting the medium is improved by keeping the medium in a state where the medium is reliably stored in the storage of the tray, various medium processing works can be smoothly performed.

The restraining member may have a contact portion which comes in contact with an engaging portion provided in the tray.

With this configuration, by surely restraining the upward pivot of the front end of the moved tray, it is possible to satisfactorily hold the medium in the storage.

The restraining member may be movable in a moving direction of the tray and the contact portion may be upwardly inclined toward the processor.

With this configuration, by moving the restraining member, it is possible to easily adjust the position where the contact portion comes in contact with the upper portion of the front end of the tray.

The restraining member may be pivotable about an axis line perpendicular to a moving direction of the tray.

With this configuration, by pivoting the restraining member, it is possible to easily adjust the position where the contact portion comes in contact with the engaging portion of the tray.

The restraining member may be disposed on a side where the tray moving mechanism is disposed in a direction perpendicular to a moving direction of the tray. Accordingly, it is preferable in that the medium tray is not moved and stably restrained from moving by restraining a side having a stronger upward rotational force by the restraining member.

The restraining member may have a deformable elastic portion. Accordingly, it is preferable in that rotational energy is considerably reduced and a collision sound is reduced.

The engaging portion may have an upper face of the tray at a front end side of the tray. Accordingly, it is preferable in that a gap with the restraining member is adjusted with high precision in consideration of substantial rotation.

BRIEF DESCRIPTION OF THE DRAWINGS

The advantages of the present invention will become more apparent by describing in detail preferred exemplary embodiments thereof with reference to the accompanying drawings, wherein.

DETAILED DESCRIPTION OF THE EMBODIMENTS

Hereinafter, a medium processing device will be described with reference to the drawings according to an exemplary embodiment of the invention.

Figure 1:
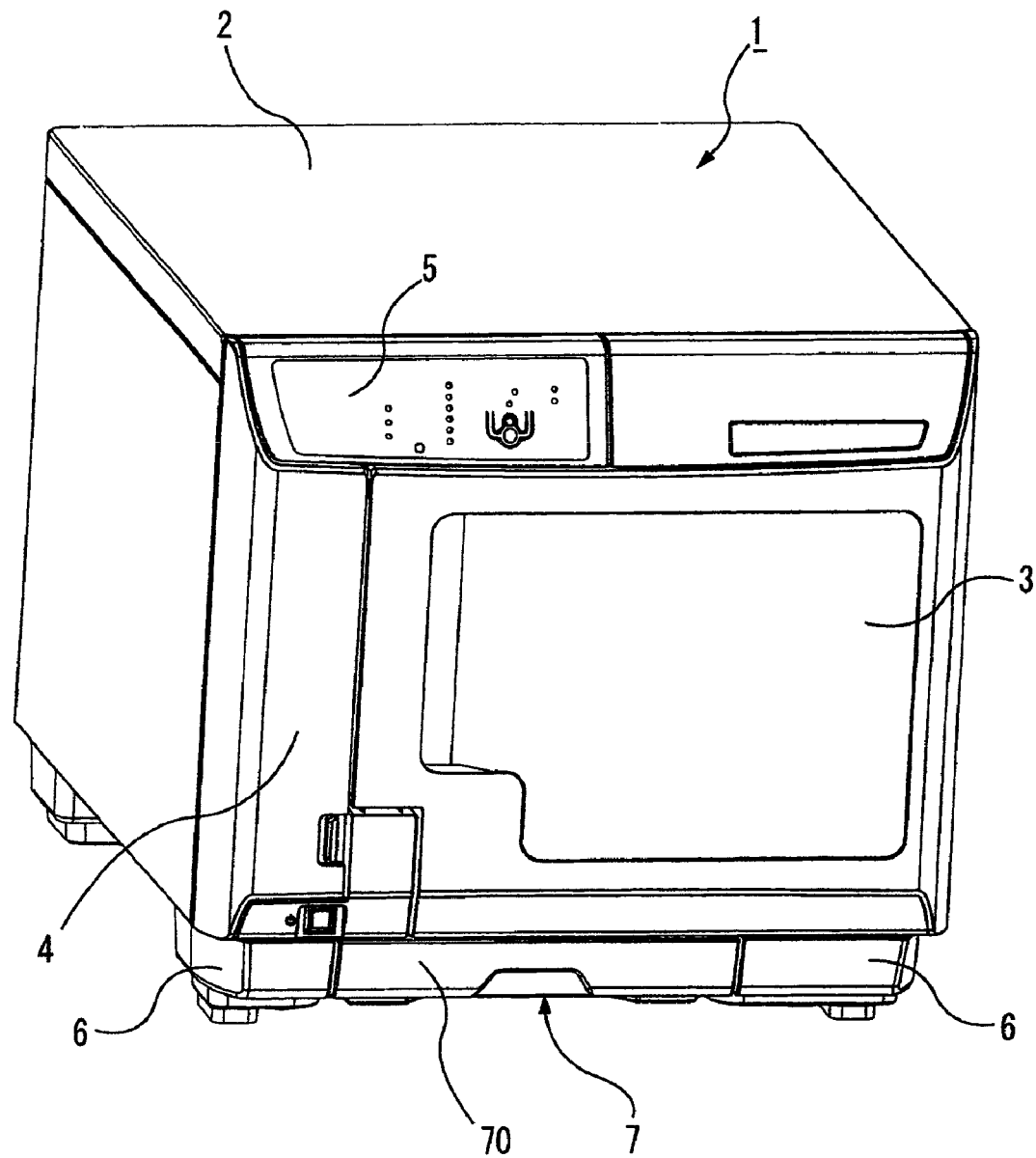
FIG. 1 is a perspective view illustrating an outer appearance of a medium processing device (a publisher) according to the invention.

As shown in FIG. 1, a publisher 1 is a medium processing device, which writes data on circular disc-shaped media such as CDs or DVDs or prints on a label surface of the media, includes a substantially rectangular parallelepiped case 2. Openable doors 3 and 4 capable of being opened and closed are attached on a front surface of the case 2. An operation surface 5 provided with display lamps, operation buttons, and the like is formed in an upper left end of the case 2. In a lower portion of the case 2, leg portions 6 projecting downward are provided on right and left sides. A drawing mechanism 7 is provided between the right and left leg portions 6.

Figure 2:
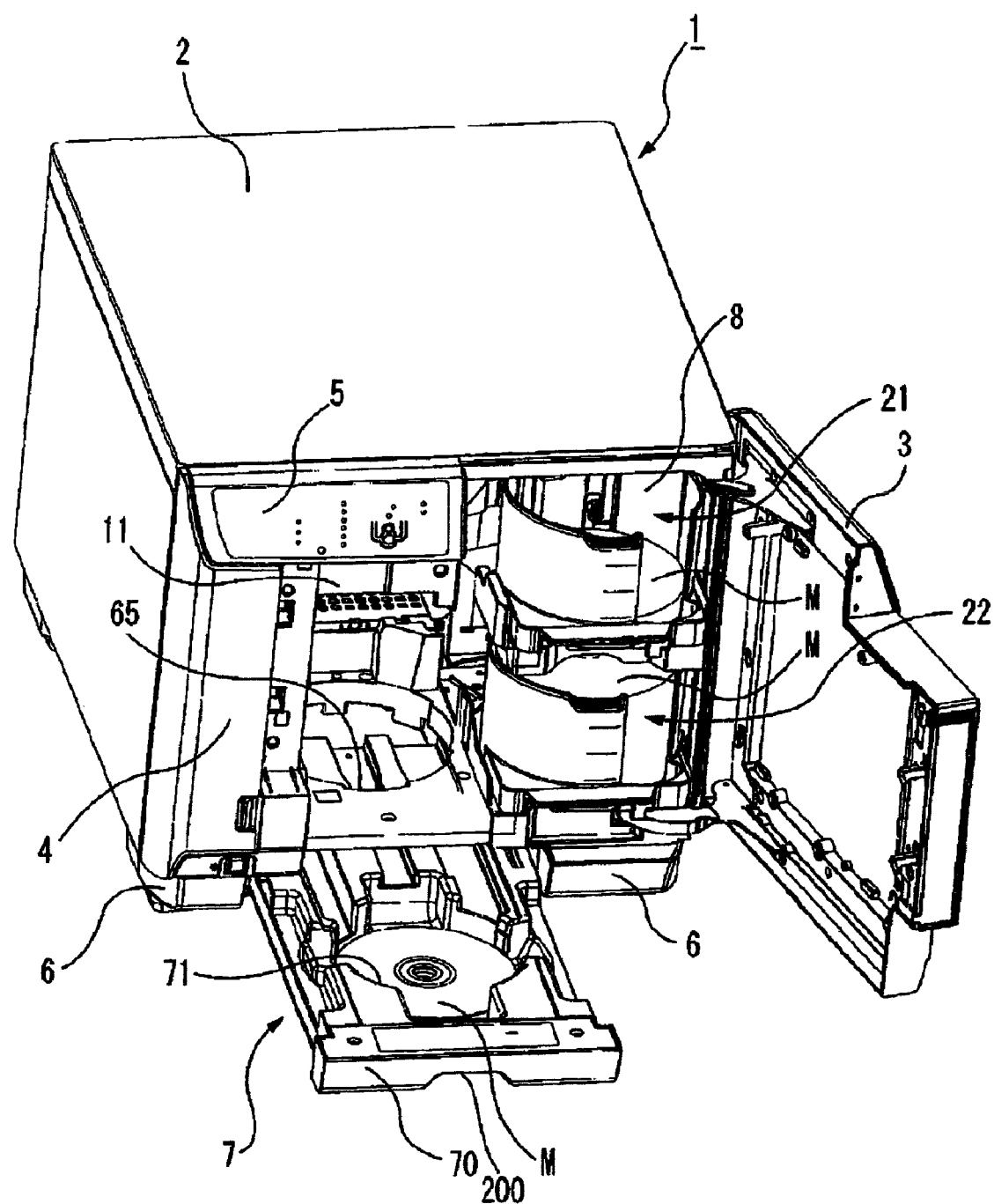
FIG. 2 is a perspective view illustrating the publisher in view of a front side in a state where a case of the publisher in FIG. 1 is removed.

As shown in FIG. 2, the openable door 3, which is disposed on the right side on a front side, opens and closes and provides an opening 8 on the front side of the publisher 1. The openable door 3 is opened when unprocessed (blank) media M are set through the opening 8 or processed media M are removed through the opening 8, for example.

In addition, the openable door 4, which is disposed on the left side on the front side, is opened when ink cartridges 12 of a label printer 11 (shown in FIG. 3) are replaced. When the openable door 4 is opened, a cartridge mounting unit 14 having plural cartridge holders 13 arranged in a vertical direction is exposed.

Inside the case 2 of the publisher 1, a medium stacker 21 as a storage unit capable of stacking plural sheets (for example, 50 sheets) of unprocessed media M and a medium stacker 22 as a medium storage unit capable of stacking plural sheets (for example, 50 sheets) of unprocessed media M or processed (verify) media M are disposed vertically so that a central axis line of the stored media M are the same. The medium stacker 21 and the medium stacker 22 are detachably mounted at predetermined positions, respectively.

The upper medium stacker 21 includes a pair of right and left arc frame plates 24 and 25, and receives the media M from an upper side and concentrically stacks the media M. A process of stacking or replenishing media M in the medium stacker 21 can be simply carried out by opening the openable door 3 and taking out the medium stacker 21.

The lower medium stacker 22 has the same structure as that of the upper medium stacker 21. That is, the lower medium stacker 22 also includes a pair of right and left arc frame plates 27 and 28, and receives the media M from an upper side and concentrically stacks the media M.

A medium transporting mechanism 31 is disposed on a rear side of the medium stackers 21 and 22. The medium transporting mechanism 31 includes a vertical guide shaft 35 extending vertically between a main body frame 30 and a top plate 33 of a chassis 32. A transporting arm 36 is supported by the vertical guide shaft 35 so as to ascend, descend, and rotate. The transporting arm 36 is capable of ascending and descending along the vertical guide shaft 35 by the drive of a driving motor 37 and capable of rotating right and left on the vertical guide shaft 35.

On a side portion of a rear of the upper medium stacker 21, the lower medium stacker 22, and the medium transporting mechanism 31, two medium drives 41 stacked vertically are disposed. In addition, a carriage 62 of the label printer 11, which is described below, is movably disposed on a lower side of the medium drives 41.

The medium drives 41 are each provided with a medium tray 41a that moves between a position where data are written on a medium M and a position where the medium M is received when the medium M are granted and received, so as to be advanced and retreated.

The label printer 11 includes a medium tray 45 capable of moving between a printing position where label printing on a label surface of the medium M is performed and the position where the medium M is granted when the medium M are granted and received.

Figure 3:
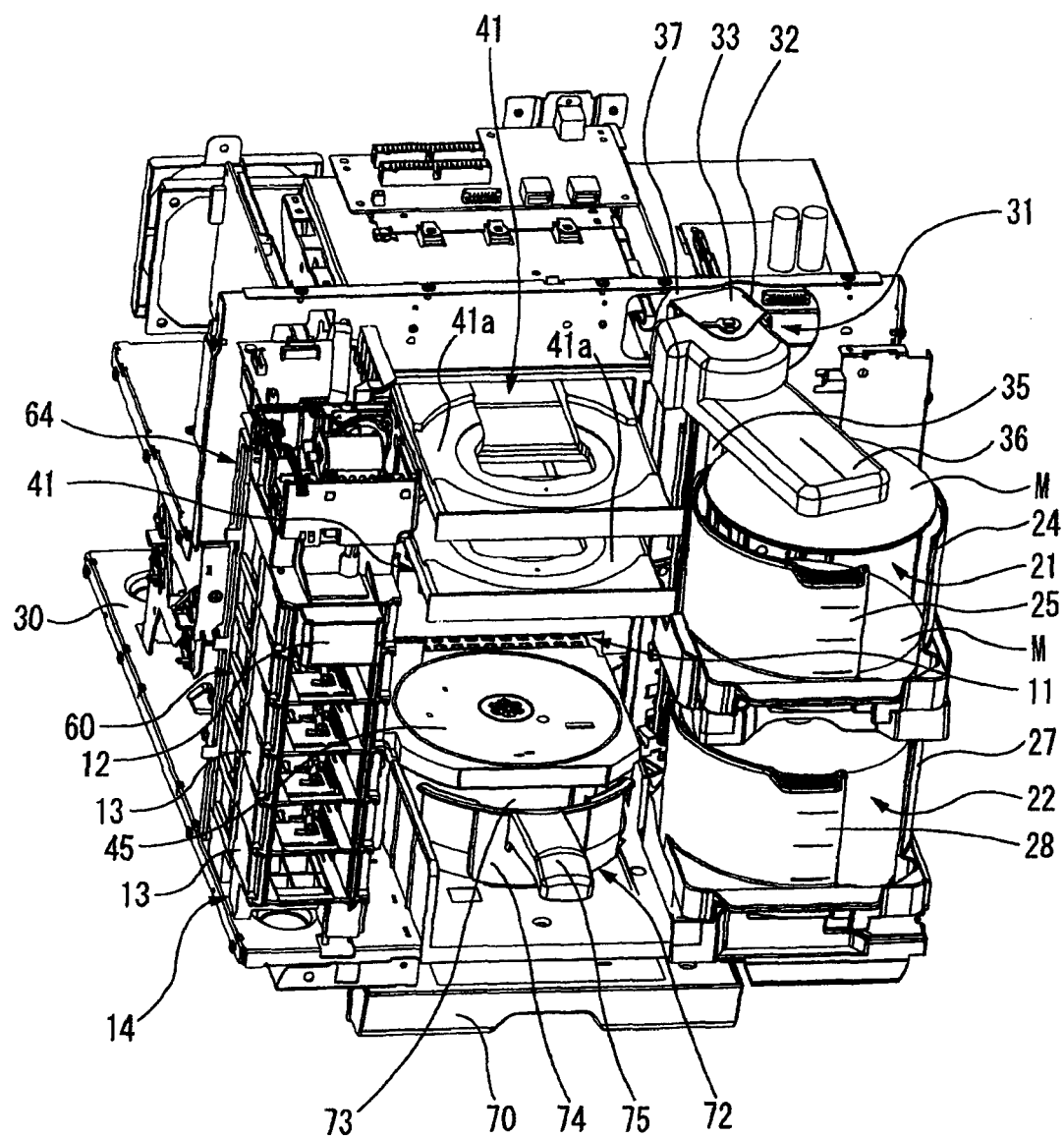
FIG. 3 is a perspective view illustrating the publisher in view from a rear side in a state where a case of the publisher in FIG. 1 is removed.

FIG. 3 shows that the medium trays 41a of the upper and lower medium drives 41 are drawn and projected forward from a main body to be positioned at the position where the medium are granted and received. The medium tray 45 of the lower label printer 11 is positioned at the position where the medium are granted and received also. In addition, the label printer 11 is an ink-jet printer and uses the ink cartridges 12 of respective colors (six colors of black, cyan, magenta, yellow, light cyan, and light magenta in this embodiment) as an ink supply mechanism 60. The ink cartridges 12 are mounted from a front side on respective cartridge holders 13 of the cartridge mounting unit 14.

Here, spaces where the transporting arm 36 of the medium transporting mechanism 31 ascends and descends are formed between the pair of right and left frame plates 24 and 25 of the medium stacker 21 and between the pair of right and left frame plates 27 and 28 of the medium stacker 22. In addition, a space where the transporting arm 36 of the medium transporting mechanism 31 rotates horizontally and is positioned directly above the medium stacker 22 is formed between the upper medium stacker 21 and the lower medium stacker 22. In addition, when both the medium trays 41a enter the medium drives 41, the transporting arm 36 of the medium transporting mechanism 31 descends to gain access to the medium tray 45 positioned at the position where the medium are received.

The transporting arm 36 of the medium transporting mechanism 31 is capable of descending lower than the height position of the medium tray 45 in a state where both the medium trays 41a are positioned at the position where data are written and the medium tray 45 is positioned at an inward printing position. In addition, below the position of the medium tray 45 where the media are granted and received, a guide hole 65 in which a medium stacker (separate stacker) described below is formed as a guide for passing the medium M, which the transporting arm 36 descends to the position releases.

The drawing mechanism 7 includes a drawing tray 70 capable of drawing and opening the medium from the main body frame 30 or receiving and closing the medium in a lower portion of the main body frame 30. In the drawing tray 70, a stacker unit 71 is formed downward in a concave shape. When the drawing tray 70 is positioned at a receiving position (close position), the stacker unit 71 is positioned below the guide hole 65 and the center of the stacker unit 71 is positioned so that central axis lines of both the medium tray 41a and the medium tray 45 at the position where the medium are granted and received are the same. The stacker unit 71 receives the medium M inserted through the guide hole 65 and holds a small number (for example, 5 sheets to 10 sheets) of the medium M. The stacker unit 71 receives the medium M from the upper side to concentrically stack the medium M.

In addition, when the medium M received in the stacker unit 71 is taken out, an operator hooks a lock portion 200 (see FIG. 2) formed in a front surface of the drawing tray 70 with fingers to draw the drawing tray 70 from the main body frame 30.

In the stacker unit 71 of the drawing tray 70 in a received state and the guide hole 65, a medium stacker (separate stacker) 72 capable of receiving more medium M than the stacker unit 71 is detachably mounted (see FIG. 3). The medium stacker 72 that also includes a pair of arc frame plates 73 and 74 receives the medium M from the upper side and holds plural sheets (for example, 50 sheets) of medium so as to concentrically stack the medium. A space where the transporting arm 36 of the medium transporting mechanism 31 ascends and descends is formed between one pair of the arc frame sheets 73 and 74. In addition, a grip 75 allowing a user to attach and detach the medium stacker 72 is provided above the frame plate 74.

When the medium stacker 72 is attached, the unprocessed media M are taken from the upper medium stacker 21 to allow the medium drive 41 and the label printer 11 to perform data recording and printing, and the media M are received in the medium stacker 72.

For example, the maximum number (50 sheets+50 sheets) of the unprocessed media M are loaded in the upper medium stacker 21 and the lower medium stacker 22, and all the sheets (50 sheets) of the media M loaded in the lower medium stacker 22 are processed in succession and received in the medium stacker 72. Next, all the sheets (50 sheets) of the media M loaded in the upper medium stacker 21 are processed in succession and received in the vacant lower medium stacker 22. In this way, the maximum number (50 sheets+50 sheets) of the media M loaded in the upper medium stacker 21 and the lower medium stacker 22 are processed at one time (batch processing mode).

When the medium stacker 72 is separated, the unprocessed media M are taken from the upper medium stacker 21 or the lower medium stacker 22 to allow the medium drive 41 and the label printer 11 to perform data recording and printing, and the media M are received in the stacker unit 71 of the drawing tray 70 in the received state.

Thereafter, by drawing the drawing tray 70, the processed media M are taken from the stacker unit 71. That is, even while the media M are processed, one sheet or plural sheets of the processed media M can be sequentially taken from the stacker unit 71 with the openable door 3 closed (outside discharge mode).

Here, by combination operations of ascending, descending, right rotation, and left rotation of the transporting arm 36 of the medium transporting mechanism 31, the media M are appropriately transported among the medium stacker 21, the medium stacker 22, the stacker unit 71 (or the medium stacker 72) of the drawing tray 70, the medium tray 41a of each medium drive 41, and the medium tray 45 of the label printer 11.

Figure 4:
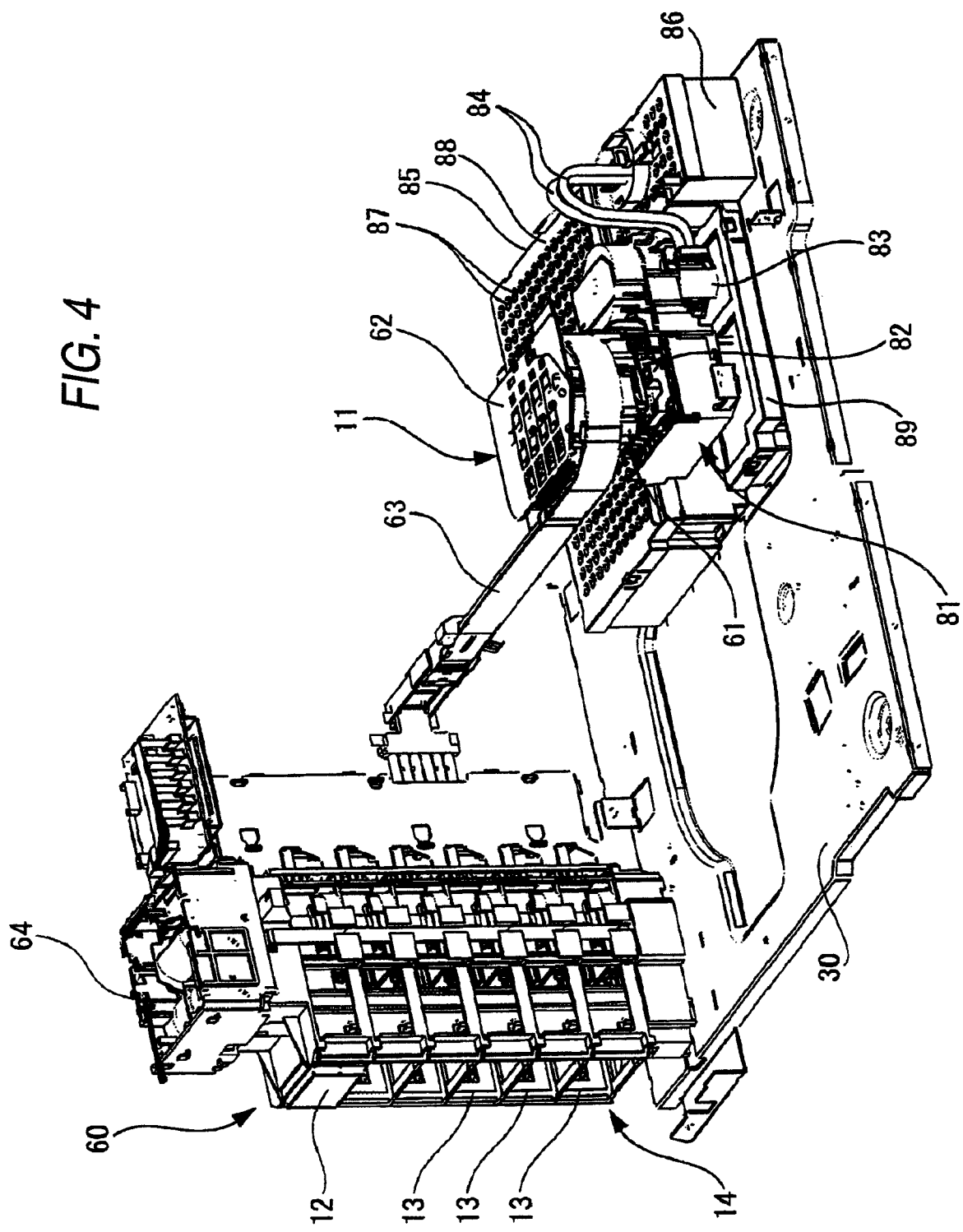
FIG. 4 is a perspective view illustrating a printer installed in the publisher in FIG. 1.

As shown in FIG. 4, the label printer 11 is provided with the carriage 62 that includes an ink-jet head 61 with nozzles (not shown) for ink ejection. The carriage 62 reciprocates in a horizontally along a guide shaft (not shown) by a driving force of a carriage motor 68.

The label printer 11 is provided with the ink supply mechanism 60 that includes the cartridge mounting unit 14 in which the ink cartridges 12 are mounted. The ink supply mechanism 60, which have a longitudinal shape, is erected on the main body frame 30 of the publisher 1 to be arranged in the vertical direction. One end of a flexible ink supply tube 63 is connected to the ink supply mechanism 60 and the other end of the ink supply tube 63 is connected to the carriage 62.

Ink of each ink cartridge 12 mounted on the ink supply mechanism 60 is supplied to the carriage 62 through the ink supply tube 63. In addition, the ink is supplied to the ink-jet head 61 through a damper unit and a back-pressure adjusting unit (not shown) provided in the carriage 62 to be ejected from ink nozzles (not shown).

The ink supply mechanism 60 includes a pressurizing mechanism 64 in the upper portion. Accordingly, the pressurizing mechanism 64 pressurizes the inside of each ink cartridge 12 by sending compressed air to supply the ink stored in an ink pack of each ink cartridge 12.

A head maintenance mechanism 81 is provided below a home position (position shown in FIG. 4) of the carriage 62.

The head maintenance mechanism 81 includes a head cap 82 that covers the ink nozzles of the ink-jet head 61 exposed to the lower surface of the carriage 62 disposed at the home position; and a used-ink sucking pump 83 which sucks the ink discharged to the head cap 82 by a head cleaning operation or an ink filling operation on the ink-jet head 61.

The ink sucked by the used-ink sucking pump 83 of the head maintenance mechanism 81 is sent to a used-ink absorbing tank 85 through a tube 84.

In the used-ink sucking tank 85, an absorption material is disposed within a case 86 and an upper surface of the used-ink absorbing tank 85 is covered with a cover 88 having plural airing holes 87.

In the lower portion of the head maintenance mechanism 81, a used-ink receiver 89 that is a part of the used-ink absorbing tank 85 is provided so as to receive ink dropped from the head maintenance mechanism 81 and to absorb the dropped ink by the absorption material.

Figure 5:
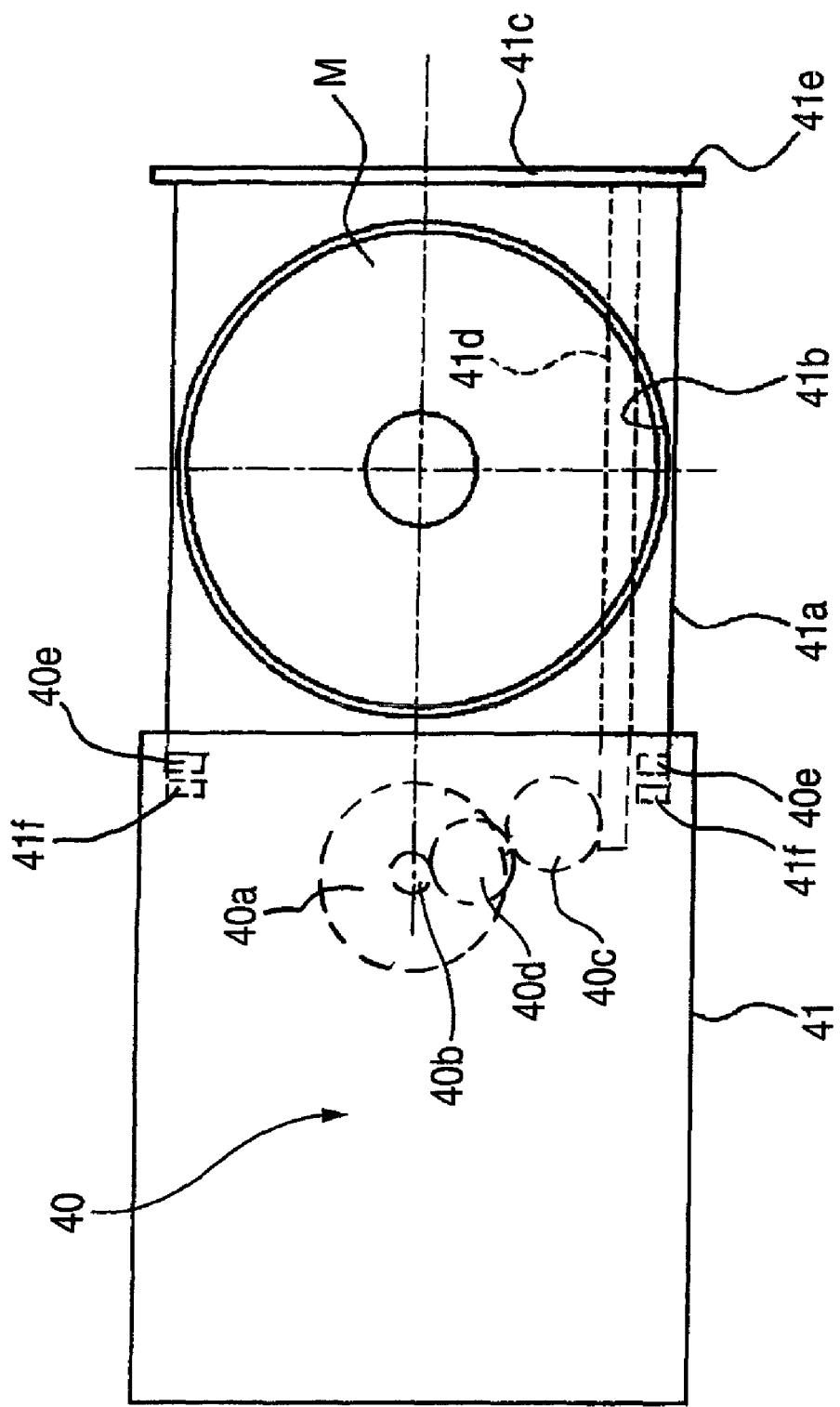
FIG. 5 is a schematic plan view illustrating the configuration of a medium drive installed in the publisher of FIG. 1.

As described above, the medium drive (processor) 41 includes the medium tray (tray) 41a capable of being advanced and retreated. Accordingly, as shown in FIG. 5, a medium (hereinafter, generally referred to as the medium M) is received in a circularly concave reception portion 41b formed in the surface of the medium tray 41a. The medium tray 41a is advanced and retreated by a tray moving mechanism 40 having a rack and a pinion using a rotational motion of a driving motor shown below and includes an end-face plate 41c in the end of a front side in a projection direction. Specifically, in the medium tray 41a, a rack 41d formed in advance and retreat directions is formed in the vicinity of one side thereof and a pinion 40c engaging the rack 41d is advanced or retreated by a rotational motion of the driving motor 40a with round gears 40b and 40d interposed therebetween.

A sensor detecting the movement of the medium tray 41a up to a predetermined position is provided in the medium drive 41. Power supply to the driving motor driving the pinion is stepped by a signal detected by the sensor. Timing at which the power supply is stopped is set as timing at which rear-side lock portions 41f of the medium tray 41a come in contact with movement stopping portions 40e formed within the medium drive 41. That is, the medium tray 41a moves forward until the lock portions 41f of the medium tray 41a comes in contact with the movement stopping portions 40e and stops at a predetermined projection position (second position).

In each of the medium drives 41, the medium M is granted and received or the medium M is received using the transporting arm (medium transporting mechanism) 36 in a state where the medium tray 41a is projected at the position where the medium are received when the medium are granted and received, which is the predetermined projection position.

Figure 6:
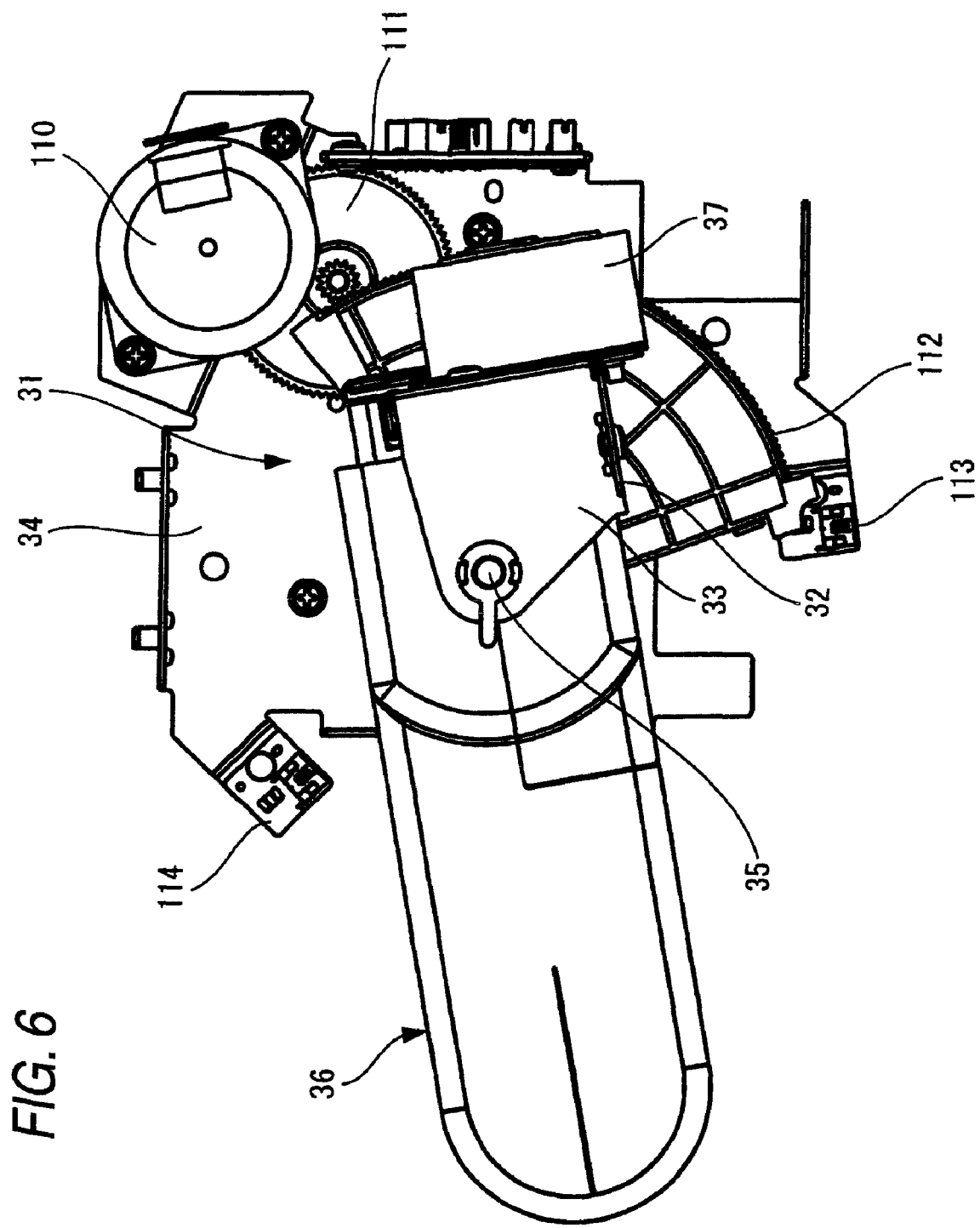
FIG. 6 is a plan view illustrating a transporting arm mounted on the publisher in FIG. 1.

As shown in FIG. 6, below the chassis 32 forming the medium transporting mechanism 31, a fan-shaped toothed gear 112 to which a driving force of a driving motor 110 is delivered through a transfer toothed gear 111 is provided so as to be rotatable about the vertical guide shaft 35. With such a configuration, the transporting arm 36 rotates on the vertical guide shaft 35 by a rotational motion of the fan-shaped toothed gear 112 driven by the driving motor 110.

A lower-side horizontal support plate 34 is provided with an optical rotation HP (home position) detector 113 and a stacker position detector 114 that each detect the ends of the outer edge of the fan-shaped toothed gear 112. The rotation HP detector 113 and the stacker position detector 114 detect the position of the transporting arm 36 in a horizontal plane.

Here, the rotation HP detector 113 detects whether in the horizontal plane, the transporting arm 36 is positioned at a position where the medium M is granted and received with the medium tray 41a of the medium drive 41, a position where the medium M is granted and received with the medium tray 45 of the label printer 11, and a position where the medium M is released in the stacker unit 71 (or the medium stacker 72) of the drawing tray 70.

The stacker position detector 114 detects whether in the horizontal plane, the transporting arm 36 is positioned at a position where the medium M are granted and received with the medium stackers 21 and 22.

Figure 7:
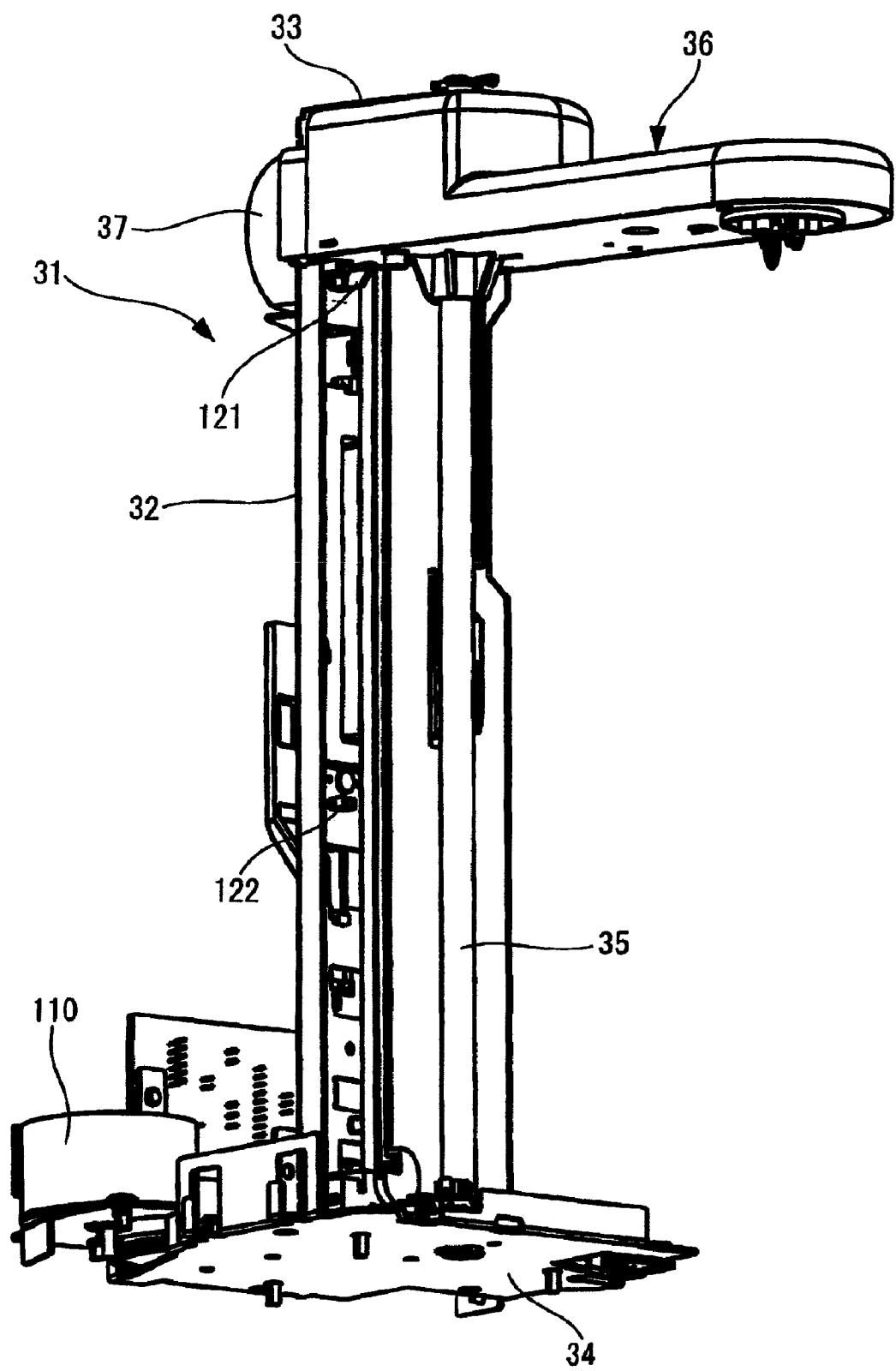
FIG. 7 is a perspective view illustrating the transporting arm mounted on the publisher in FIG. 1.

As shown in FIG. 7, a vertical optical HP (home position) detector 121 and an intermediate optical position detector 122 are provided in the vicinity of an upper end and an intermediate of the chassis 32 forming the medium transporting mechanism 31. Accordingly, the vertical HP detector 121 and the intermediate position detector 122 detect the position of the transporting arm 36 in a vertical direction.

The vertical HP detector 121 in the vicinity of the upper end detects whether the transporting arm 36 is positioned in the upper position of the medium stacker 21. The intermediate position detector 122 detects whether the transporting arm 36 is positioned between the medium stacker 21 and the medium stacker 22.

When the medium transporting mechanism 31 transports the medium M received in the medium tray 41a of the medium drive 41, the transporting arm 36 descends from the upper side to receive the medium M in a state where the medium tray 41a projects up to the predetermined position (second position) where the medium tray 41a receives or takes out the medium M.

In a case where the medium tray 41a moves from the medium drive 41 and stops at a predetermined position, when the lock portions 41f come in contact with the movement stopping portions 40e within the medium drive 41, it may be assumed that the end-face plate 41c in the front end of a movement direction of the medium tray 41a rotates upward at collision time to the movement stopping portions 40e and the medium M received in the concave reception portion 41b of the medium tray 41a are uplifted to fall out of the concave reception portion 41b. However, the publisher 1 according to this embodiment is provided with a restraint unit that restrains the end-face plate 41c of the medium tray 41a moved from the medium drive 41 from rotating upward.

Figure 8:
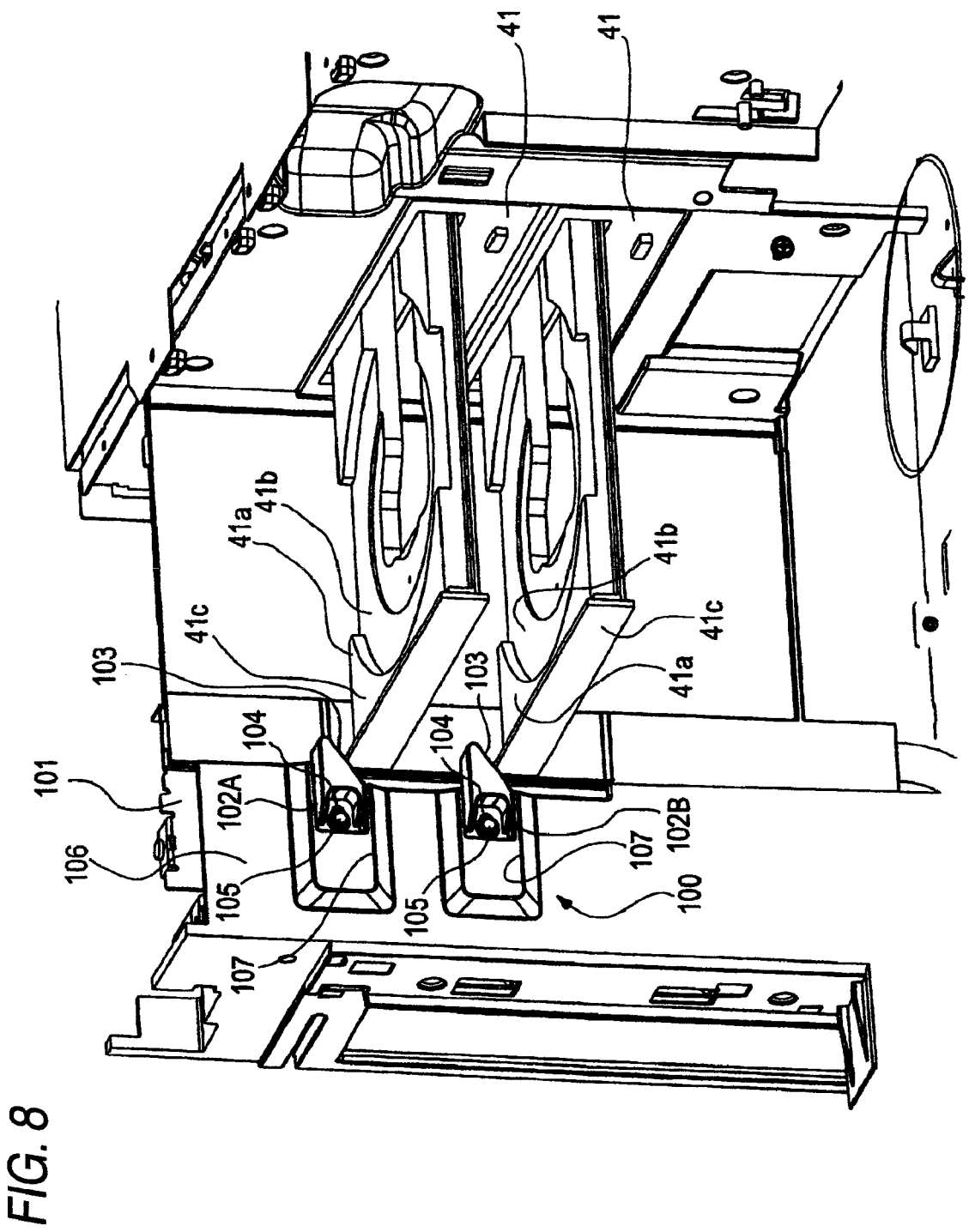
FIG. 8 is a perspective view illustrating the tray which projects from the medium drive in FIG. 5.

As shown in FIG. 8, a restraint unit 100 includes two upper and lower restraining members 102A and 102B corresponding to the medium drives 41, respectively. On a front-side of the medium drives 41, the restraining members 102A and 102B are attached to a side plate 101 covering the side of the cartridge mounting unit 14 of the ink supply mechanism 71.

The restraining members 102A and 102B each includes a contact portion 103 that is gradually inclined upward to the medium drive 41a in the end of the medium drive 41. The contact portion 103 is disposed at a position where a gap with an upper portion (engaging portion) 41e of the end-face plate 41c is 0.5 mm or less, that is, the gap is almost not present, when the lock portions 41f of the medium tray 41a come in contact with the movement stopping portions 40e and stops.

The restraining members 102A and 102B, which each have a long hole 104 in front and rear directions, are fixed to the side plate 101 by inserting a screw 105 through the long hole 104 to fix to a screw hole (not shown) formed in the side plate 101.

In a cover 106 attached to the side plate 101, a rack portion 107 is disposed having a height for fixing the screw 105. The restraining members 102A and 102B are disposed in the respective rack portions 107 to slide along the rack portions 107 in the front and rear directions.

When each of the restraining members 102A and 102B is moved along the rack portion 107 in the front and rear directions and positioned in a state where the screw 105 is loose and the medium tray 41a is moved up to the maximum projecting position, where the lock portions 41f come in contact with the movement stopping portions 40e, each of the restraining members 102A and 102B is fixed at a position where the contact portion 103 comes in contact with the upper portion 41e of the end-face plate 41c of the front end of the medium tray 41a.

In the publisher 1, when the medium tray 41a is moved from the medium drive 41 up to the maximum projecting position of the predetermined position where the media M are received and the media M are granted and received by the transporting arm 36, the upper portion 41e of the end-face plate 41c of the front end of the medium tray 41a comes in contact with the contact portion 103 of the restraining members 102A and 102B. Accordingly, even when the lock portions 41f of the medium tray 41a come in contact with the movement stopping portions 40e and the front end (the end-face plate 41c) is likely to rotate upward, the restraining members 102A and 102B are capable of restraining the upward rotation.

In this way, since it is possible to restrain the medium M received in the concave reception portion 41b of the medium tray 41a from being uplifted, the medium M is prevented from falling out of the concave reception portion 41b.

Accordingly, reliability for receiving the medium M is improved by allowing the medium M to be surely received in the concave reception portion 41b of the medium tray 41a, thereby smoothly carrying out various processing for the medium M.

Moreover, since the restraining members 102A and 102B are capable of moving in the advance and retreat directions of the medium tray M and the contact portion 103 has the shape gradually inclined upward to the medium drive 41, it is easy to adjust the position where the contact portion 103 comes in contact with the upper portion 41e of the end-face plate 41c of the front end of the medium tray 41a by moving the restraining members 102A and 102B in the front and rear directions, thereby determining optimum positions of the restraining members 102A and 102B.

Next, modified examples of the above-mentioned embodiment will be described.

Figure 9:
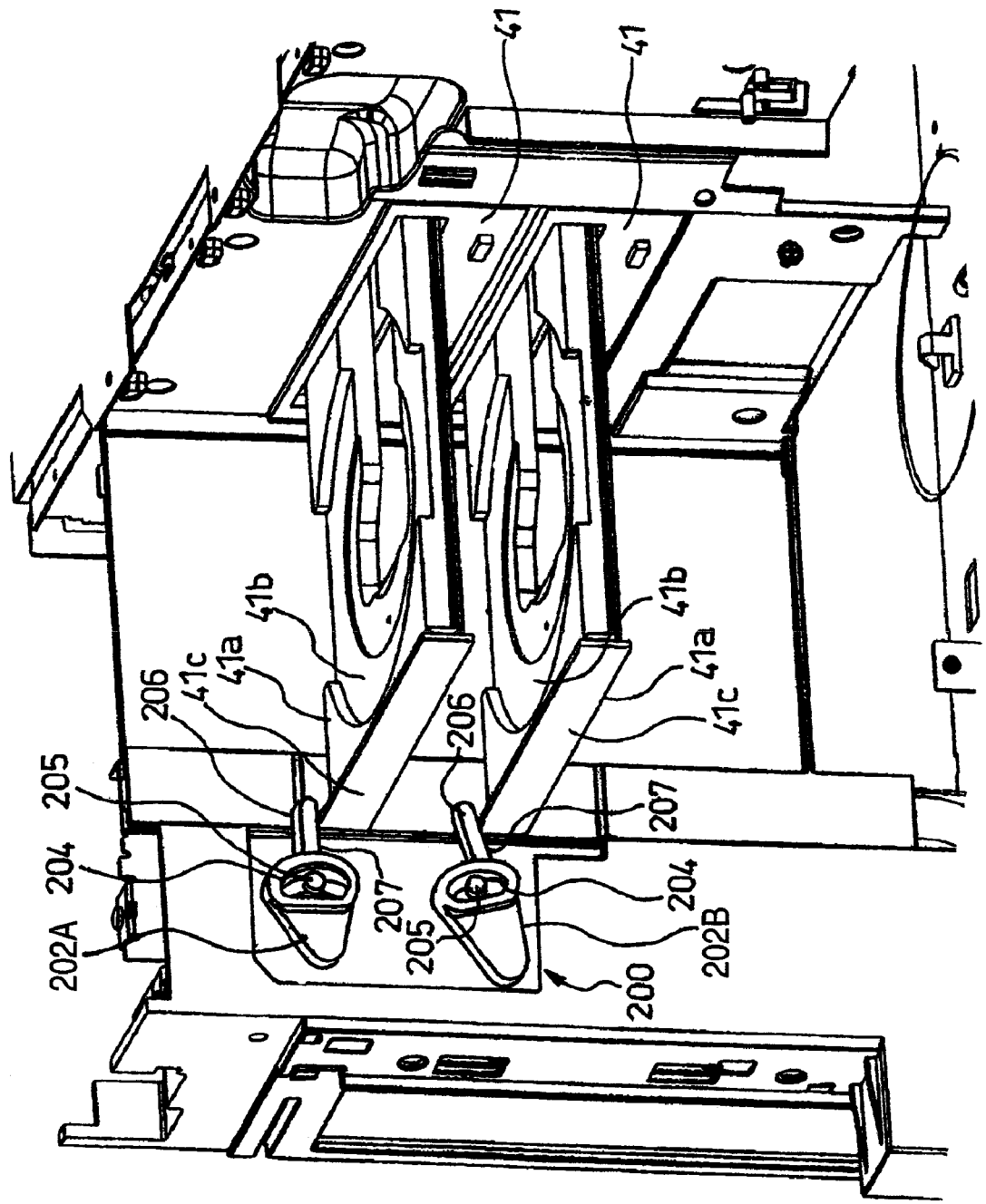
FIG. 9 is a perspective view illustrating the tray which projects according to another embodiment.

As shown in FIG. 9, restraining members 202A and 202B constituting a restraint unit 200 are supported in the vicinity of the end opposite the medium drives 41 so as to be pivotable about an axis line in a width direction of the medium drives 41a with respect to the side plate 101, which covers the side of the cartridge mounting unit 14 of the ink supply mechanism 71. In addition, the rotational center of the restraining members 202A and 202B are at positions of the left end of FIG. 9.

The restraining members 202A and 202B each have a long hole 204 having an arc shape on the rotational center and are fixed to the side plate 101 by inserting screws 205 through the long holes 204 and tightening the screws 205 in screw holes (not shown) formed in the side plate 101.

The restraining members 202A and 202B each have a projection portion 206 projecting toward the medium drive 41. A lower side of the projection portion 206 corresponds to a contact portion 207.

When each of the restraining members 202A and 202B pivot about the rotational center with the side plate 101 and positioned in a state where the screw 205 is loose and the medium tray 41a is moved up to the maximum projecting position, where the lock portions 41f come in contact with the movement stopping portions 40e, each of the restraining members 202A and 202B is fixed at a position where the contact portion 207 of the projection portion 206 comes in contact with the upper portion 41e of the front end of the medium tray 41a.

In the publisher 1 including the restraint unit 200, when the medium tray 41a is moved up to the maximum projecting position of the predetermined position where the medium M is received and the medium M is granted and received by the transporting arm 36, the upper portion 41e of the end-face plate 41c of the front end of the medium gray 41a comes in contact with the contact portion 207 of the projection portion 206 of the restraining members 202A and 202B of the restraint unit 200. Accordingly, even when the medium tray 41a comes in contact with the movement stopping portions 40e and is likely to rotate upward, the restraining members 202A and 202B are capable of restraining the upward rotation.

In this way, since it is possible to restrain the medium M received in the concave reception portion 41b of the medium tray 41a from being uplifted, the medium M is prevented from falling out of the concave reception portion 41b.

Accordingly, reliability for receiving the medium M is improved by allowing the medium M to be surely received in the concave reception portion 41b of the medium tray 41a, thereby smoothly carrying out various processing for the medium M.

Moreover, since the restraining members 202A and 202B are capable of rotating on the axis line in the width direction perpendicular to the movement direction of the medium tray 41a, it is easy to adjust the position where the contact portion 207 comes in contact with the upper portion 41e of the front end of the medium tray 41a by rotating the restraining members 202A and 202B, thereby determining optimum positions of the restraining members 202A and 202B.

In the above-described embodiment, the contact portion come in contact with the upper portion 41e of the front end of the medium tray 41a moving and projecting to restrain the upward rotation of the medium tray 41a. However, other examples may be used as long as there is provided a structure for restraining the rotation of the front end of the projecting medium tray 41a to restrain the upward rotation. For example, there may be provided a structure in which during movement of the medium tray 41a up to the maximum projecting position, a concave portion is fitted to a convex portion (restraining member) provided on a side attached with a drive main body, so that the restraining member restrains the rotation of the front end of the medium tray 41a.

Additionally, the restraining members 102A and 102B may be formed of resin such as ABS, but may be formed of an elastic member such as a deformable material such as rubber. In this case, the medium M is not uplifted from the medium tray due to a decrease in rotational energy, thereby not falling out of the received position. An elastic member may be provided in the contact portion. In this case, it is preferable in that a collision sound can be reduced.

The engaging portion coming in contact with the restraining member is provided in the upper portion 41e of the end-face plate 41c of the front end, but the invention is not limited to the upper portion. For example, the engaging portion may be provided in the side of the vicinity of the concave reception portion of the medium. It is preferable in that the gap with the restraining members is adjusted with high precision in consideration of substantial rotation of the end-face plate of the front end.

The restraining members are provided only on one side, but may be provided in both sides. When the restraining members are provided in the manner described in this embodiment, it is preferable that the restraining members are provided on each side of the driving unit (the rack 41d in this embodiment) formed in the medium tray 41 in order to move the medium trays 41a to the second position, since it is possible to stably restrain the movement of the medium trays in that the restraining members restrain a side having a stronger upward rotational force.

In the above-described embodiment, the invention is applied to the position where the medium M is granted to and received from the medium trays 41a of the medium drives 41, but the invention is not limited to the medium drives 41 writing data. The invention may be applied to a position where the medium M is granted to and received from the medium trays 51 in the label printer 11 performing printing on the label surfaces of the medium M.

The medium is not limited to the plate, or disc-shaped medium such as the medium M described in the embodiment, but may be applied to medium having a polygonal shape such as a rectangular shape or an elliptic shape. Moreover, the recording method is not limited to an optical recoding method or a magneto-optical recoding method.

What is claimed is:

1. A medium processing device comprising:
   a processor having a tray which has a storage configured to hold a plate-shaped medium and is capable of advancing and retreating;
   a medium transporting mechanism configured to perform transfer and reception of the medium with respect to the storage; and
   a restraining member configured to restrain an uplift movement of a front end of the tray when the tray is projected to a position where the transfer and the reception of the medium is performed by the medium transporting mechanism, wherein the restraining member has a restraining side that comes in contact with an upper portion of the front end of the tray that is projected to the position, and wherein the restraining member is movable so as to adjust a contact position between the restraining side and the upper portion of the front end of the tray.

2. The medium processing device of claim 1, wherein the restraining member is movable in an advance and retreat direction of the tray and the restraining side is upwardly inclined toward the processor.

3. The medium processing device of claim 1, wherein the restraining member is pivotable about an axis line along a width direction of the tray.

* * * * *